(12) United States Patent
Jiang et al.

(10) Patent No.: US 12,532,268 B2
(45) Date of Patent: Jan. 20, 2026

(54) METHOD AND DEVICE FOR TIMING AND POWER ADJUSTMENT IN WIRELESS COMMUNICATION

(71) Applicant: APOGEE NETWORKS, LLC, Dallas, TX (US)

(72) Inventors: Qi Jiang, Shanghai (CN); Xiaobo Zhang, Shanghai (CN)

(73) Assignee: APOGEE NETWORKS, LLC, Dallas, TX (US)

( * ) Notice: Subject to any disclaimer, the term of this patent is extended or adjusted under 35 U.S.C. 154(b) by 237 days.

(21) Appl. No.: 17/837,050

(22) Filed: Jun. 10, 2022

(65) Prior Publication Data

US 2022/0304073 A1    Sep. 22, 2022

Related U.S. Application Data

(63) Continuation of application No. PCT/CN2020/129772, filed on Nov. 18, 2020.

(30) Foreign Application Priority Data

Dec. 13, 2019    (CN) .......................... 201911282862.7

(51) Int. Cl.
*H04W 52/36* (2009.01)
*H04W 56/00* (2009.01)
(Continued)

(52) U.S. Cl.
CPC ..... *H04W 52/362* (2013.01); *H04W 56/0045* (2013.01); *H04W 74/0833* (2013.01); *H04W 74/0836* (2024.01)

(58) Field of Classification Search
CPC ................. H04W 52/14; H04W 52/50; H04W 52/146; H04W 52/36; H04W 52/362; H04W 56/0045; H04W 74/0833; H04W 74/0836
(Continued)

(56) References Cited

U.S. PATENT DOCUMENTS 11,974,233 B2    4/2024  Li et al.
2001/0038619 A1*  11/2001  Baker .................... H04W 52/54
                                                    370/335
(Continued)

FOREIGN PATENT DOCUMENTS

CN        109152029 A       1/2019
CN        109845354 A       6/2019
(Continued)

OTHER PUBLICATIONS

First Office Action of Chinses patent application No. CN201911282862.7 dated Apr. 15, 2022.
(Continued)

*Primary Examiner* — Ricardo H Castaneyra
(74) *Attorney, Agent, or Firm* — Volpe Koenig

(57) ABSTRACT

The present disclosure provides a method and device in nodes used for wireless communications. A first node transmits a first signal and a second signal, and the first signal and the second signal are both used for initiating a random access; and a target counter is used for counting of a random access; a count value of the target counter when transmitting the first signal is a first count value, and a count value of the target counter when transmitting the second signal is a second count value; a first timing offset value is used to determine a timing for transmitting the first signal. The application establishes a connection between a timing offset value and a number of transmission times of a random access channel to optimize the transmission scheme of the random access channel, thus improving the system performance.

20 Claims, 6 Drawing Sheets

100 ⟶  ( First node )
    ↓
Step 101 transmitting first signal, the first signal being used to initiate random access
    ↓
Step 102 transmitting second signal, the second signal being used to initiate random access
    ↓
( End )

(51) Int. Cl.
*H04W 74/0833* (2024.01)
*H04W 74/0836* (2024.01)

(58) Field of Classification Search
USPC .......................................................... 370/329
See application file for complete search history.

(56) References Cited

U.S. PATENT DOCUMENTS

| | | | | |
|---|---|---|---|---|
| 2005/0030919 | A1* | 2/2005 | Lucidarme | H04B 7/2681 370/328 |
| 2010/0029291 | A1 | 2/2010 | Angelow | |
| 2011/0310857 | A1* | 12/2011 | Vujcic | H04W 74/0833 370/336 |
| 2014/0044108 | A1* | 2/2014 | Earnshaw | G01S 5/0063 370/336 |
| 2014/0177525 | A1* | 6/2014 | Aydin | H04W 4/70 370/328 |
| 2015/0016352 | A1* | 1/2015 | Bressanelli | H04W 74/0833 370/329 |
| 2017/0332410 | A1* | 11/2017 | Babaei | H04W 72/0446 |
| 2019/0045457 | A1 | 2/2019 | Islam et al. | |
| 2019/0165971 | A1 | 5/2019 | Manolakos | |
| 2019/0281634 | A1 | 9/2019 | Takahashi et al. | |
| 2019/0313345 | A1 | 10/2019 | Jiang | |
| 2019/0319678 | A1 | 10/2019 | Jiang | |
| 2020/0068619 | A1* | 2/2020 | Kim | H04W 74/006 |
| 2020/0221506 | A1* | 7/2020 | Jeon | H04W 74/0833 |

FOREIGN PATENT DOCUMENTS

| | | |
|---|---|---|
| WO | 2018203698 A1 | 11/2018 |
| WO | 2019069240 A1 | 4/2019 |

OTHER PUBLICATIONS

First Search Report of Chinses patent application No. CN201911282862.7 dated Apr. 11, 2022.
Notification to Grant Patent Right for Invention of Chinses patent application No. CN201911282862.7 dated Sep. 5, 2022.
ISR received in application No. PCT/CN2020/129772 dated Feb. 5, 2021.
ZTE TP for section 6.3 on UL timing and PRACH 3GPP TSG RAN WG1 #99 R1-1912614 Nov. 8, 2019.
Third Generation Partnership Project, "Technical Specification Group Radio Access Network; NR; Physical channels and modulation (Release 15)," 3GPP TS 38.211 V15.7.0 (Sep. 2019).
Third Generation Partnership Project, "Technical Specification Group Radio Access Network; NR; Multiplexing and channel coding (Release 15)," 3GPP TS 38.212 V15.7.0 (Sep. 2019).
Third Generation Partnership Project, "Technical Specification Group Radio Access Network; NR; Physical layer procedures for control (Release 15)," 3GPP TS 38.213 V15.7.0 (Sep. 2019).
Third Generation Partnership Project, "Technical Specification Group Radio Access Network; NR; Medium Access Control (MAC) protocol specification (Release 15)," 3GPP TS 38.321 V15.7.0 (Sep. 2019).
Third Generation Partnership Project, "Technical Specification Group Radio Access Network; NR; Radio Resource Control (RRC) protocol specification (Release 15)," 3GPP TS 38.331 V15.7.0 (Sep. 2019).

* cited by examiner

METHOD AND DEVICE FOR TIMING AND POWER ADJUSTMENT IN WIRELESS COMMUNICATION

CROSS REFERENCE TO RELATED APPLICATIONS

This application is the continuation of International patent application No. PCT/CN2020/129772, filed on Nov. 18, 2020, which claims the priority benefit of Chinese Patent Application No. 201911282862.7, filed on Dec. 13, 2019, the full disclosure of which is incorporated herein by reference.

BACKGROUND

Technical Field

The present disclosure relates to transmission methods and devices in wireless communication systems, and in particular to a transmission method and device in Non-Terrestrial Networks (NTN) in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. A work item of NR was approved at 3GPP RAN #75th plenary to standardize NR.

To ensure better adaptability to various application scenarios and requirements, 3GPP RAN #75th plenary also approved a study item of NR-backed Non-Terrestrial Networks (NTN) starting with R15 version. It was decided to start studying solutions in NTN at 3GPP RAN #79 plenary and then started a WI to standardize relevant techniques in R16 or R17 version.

SUMMARY

In NTN, when a User Equipment (UE) has its own positioning capability and can estimate a transmission delay with a satellite, the UE can advance a transmission by itself when transmitting an uplink signal to the satellite to enable determining and adjusting a Timing Advance (TA) by itself, thus ensuring that a signal arriving at the satellite can be aligned with a timing of the satellite itself.

In traditional Long-Term Evolution (LTE) and 5G systems, when a transmission of a PRACH is unsuccessful, a terminal often transmits the PRACH at a higher transmit power value by means of power ramping in anticipation of being correctly received by a base station. However, when the terminal fails to receive a feedback for multiple PRACH transmissions due to an inaccurate self-adjusted TA, the terminal can adopt a traditional PRACH transmission without a TA, and meanwhile, the previously accumulated power ramping needs to be reconsidered whether it needs to be counted in a new transmit power value.

The present application provides a solution to the above problem. It should be noted that in the description of the above problems, NTN is only an example of an application scenario of the scheme provided in the present disclosure; it is also applicable to other scenarios such as terrestrial networks where similar technical effect can be achieved; similarly, the present disclosure is also applicable to the scenarios where there exist Unmanned Aerial Vehicles (UAVs) or networks of Internet of Things (IoT) devices, where similar technical effects can be achieved. In addition, a unified solution for different scenarios (including but not limited to NTN and TN scenarios) can also help reduce hardware complexity and cost.

It should be noted that the embodiments of a first node in the present disclosure and the characteristics of the embodiments may be applied to a second node if no conflict is incurred, and vice versa. Further, the embodiments and the characteristics of the embodiments in the present disclosure may be mutually combined if no conflict is incurred.

The present disclosure provides a method in a first node for wireless communications, comprising:

- transmitting a first signal, the first signal being used to initiate a random access; and
- transmitting a second signal, the second signal being used to initiate a random access;
- herein, a target counter is used for counting in a random access initiated by the first node, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the above method is essential in that: when calculating transmission times of a PRACH or a MsgA, transmission times of the PRACH or the MsgA adopting a timing offset pre-compensation will not be calculated into transmission times of the PRACH or the MsgA without adopting a timing offset pre-compensation; correspondingly, transmission times of the PRACH or the MsgA without adopting a timing offset pre-compensation will not be calculated into transmission times of the PRACH or the MsgA adopting a timing offset pre-compensation; the above methods ensure the accuracy of counting.

In one embodiment, advantages of the above method include: when the first node fails to transmit a PRACH or a MsgA for many times in a scenario where self-timing offset pre-compensation is applied, it indicates that a TA estimated by the first node may be inaccurate, or indicates a large collision on the selected PRACH resources rather than an unsuccessful random access due to insufficient transmission power; if the first node instead transmits a PRACH or a MsgA without adopting a timing offset pre-compensation at this time, the previously ramped power value needs to be recalculated to avoid interferences to other terminals and to reduce power consumption.

According to one aspect of the present disclosure, the above method is characterized in that when the first timing offset value is equal to the second timing offset value, the second count value is equal to the first count value plus 1; when the first timing offset value is not equal to the second timing offset value, the second count value is not greater than the first count value.

In one embodiment, advantages of the above method include: the first timing offset value and the second timing offset value are equal, indicating that the first node compensates for a timing offset by itself when both transmitting the first signal and the second signal, or that the first node does not compensate for a timing offset by itself when both transmitting the first signal and the second signal, and then the transmission of the first signal and the transmission of the second signal are counted uniformly.

In one embodiment, advantages of the above method include: the first timing offset value and the second timing offset value are not equal, indicating that the first node compensates for a timing offset when transmitting the first signal and does not compensate for a timing offset when transmitting the second signal, or that the first node does not compensate for a timing offset when transmitting the first signal and compensates for a timing offset when transmitting the second signal, further, the transmission of the first signal should not be counted uniformly with the transmission of the second signal.

In one embodiment, advantages of the above method include: separate counting modes are adopted for random access modes with and without a timing offset pre-compensation, so as to ensure the accuracy of power ramping.

According to one aspect of the present disclosure, the above method is characterized in that a format adopted by the first signal is related to the first timing offset value, and a format adopted by the second signal is related to the second timing offset value; a format adopted by the first signal comprises at least one of a length of a sequence generating the first signal, a length of a cyclic prefix comprised in the first signal, or a blank length comprised in time-domain resources occupied by the first signal; a format adopted by the second signal comprises at least one of a length of a sequence generating the second signal, a length of a cyclic prefix comprised in the second signal, or a blank length comprised in time-domain resources occupied by the second signal.

In one embodiment, advantages of the above method include: different PRACH formats are configured for transmission modes of a PRACH with and without adopting a timing offset pre-compensation; since it is no longer necessary to distinguish a large TA when adopting a timing offset pre-compensation, a length of a sequence corresponding to an adopted PRACH format is short; since it is necessary to distinguish a large TA when not adopting a timing offset pre-compensation, a length of a sequence corresponding to an adopted PRACH format is long; the above method optimizes the PRACH configuration to avoid wasting too many long sequences.

According to one aspect of the present disclosure, the above method is characterized in comprising:
  receiving first information;
  herein, the first information is used to determine a first target power value and a first step-size; when the first count value is greater than 1, the first target power value, the first step-size and the first count value are used together to determine a transmit power value of the first signal; when the first count value is equal to 1, only the first target power value among the first target power value, the first step-size and the first count value is used to determine a transmit power value of the first signal.

According to one aspect of the present disclosure, the above method is characterized in that when the first timing offset value is equal to the second timing offset value, the first target power value, the first step-size and the second count value are used together to determine a transmit power value of the second signal.

According to one aspect of the present disclosure, the above method is characterized in comprising:
  receiving second information;
  herein, the second information is used to determine a second step-size; when the first timing offset value is not equal to the second timing offset value and the second count value is greater than 1, the first target power value, the second step-size and the second count value are used together to determine a transmit power value of the second signal; when the first timing offset value is not equal to the second timing offset value and the second count value is equal to 1, only the first target power value among the first target power value, the second step-size and the second count value is used to determine a transmit power value of the second signal.

In one embodiment, advantages of the above method include: different power ramping step-sizes are respectively configured for random access with and without a timing offset pre-compensation to optimize the selection of transmit power.

According to one aspect of the present disclosure, the above method is characterized in comprising:
  receiving a third signal;
  herein, the third signal is used to determine the reference timing; a timing offset between a timing for transmitting the first signal and the reference timing is equal to the first timing offset value, and a timing offset between a timing for transmitting the second signal and the reference timing is equal to the second timing offset value.

According to one aspect of the present disclosure, the above method is characterized in that a capability of the first node is used to determine the first timing offset value.

According to one aspect of the present disclosure, the above method is characterized in comprising:
  receiving third information;
  herein, when the first timing offset value is not equal to the second timing offset value, the second count value is equal to 1, and the third information is used to determine an upper limit of the first count value.

In one embodiment, the above method is essential in that: the first node transmits the first signal adopting a timing offset pre-compensation, and the first node transmits the second signal without adopting a timing offset pre-compensation, and the second signal is recorded as a first transmission without adopting a timing offset pre-compensation.

In one embodiment, the above method is essential in that: the first node transmits the first signal without adopting a timing offset pre-compensation, and the first node transmits the second signal adopting a timing offset pre-compensation, and the second signal is recorded as a first transmission adopting a timing offset pre-compensation.

According to one aspect of the present disclosure, the above method is characterized in comprising:
  receiving a fourth signal;
  herein, the fourth signal is used to indicate that the first node can determine the first timing offset value according to its own capability, or the fourth signal is used to indicate that the first node can determine the second timing offset value according to its own capability.

In one embodiment, advantages of the above method include: whether the first node can determine the first timing offset value based on its own capability and adopt the first timing offset value to transmit the first signal needs to be indicated and allowed by the base station, so as to facilitate the allocation of PRACH resources by the base station.

The present disclosure provides a method in a second node for wireless communications, comprising:
  detecting a first signal, the first signal being used to initiate a random access; and
  detecting a second signal, the second signal being used to initiate a random access;
  herein, a target counter is used for counting in a random access initiated by a transmitter of the first signal, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

According to one aspect of the present disclosure, the above method is characterized in that when the first timing offset value is equal to the second timing offset value, the second count value is equal to the first count value plus 1; and when the first timing offset value is not equal to the second timing offset value, the second count value is not greater than the first count value.

According to one aspect of the present disclosure, the above method is characterized in that a format adopted by the first signal is related to the first timing offset value, and a format adopted by the second signal is related to the second timing offset value; a format adopted by the first signal comprises at least one of a length of a sequence generating the first signal, a length of a cyclic prefix comprised in the first signal, or a blank length comprised in time-domain resources occupied by the first signal; a format adopted by the second signal comprises at least one of a length of a sequence generating the second signal, a length of a cyclic prefix comprised in the second signal, or a blank length comprised in time-domain resources occupied by the second signal.

According to one aspect of the present disclosure, the above method is characterized in comprising:
  transmitting first information;
  herein, the first information is used to determine a first target power value and a first step-size; when the first count value is greater than 1, the first target power value, the first step-size and the first count value are used together to determine a transmit power value of the first signal; when the first count value is equal to 1, only the first target power value among the first target power value, the first step-size and the first count value is used to determine a transmit power value of the first signal.

According to one aspect of the present disclosure, the above method is characterized in that when the first timing offset value is equal to the second timing offset value, the first target power value, the first step-size and the second count value are used together to determine a transmit power value of the second signal.

According to one aspect of the present disclosure, the above method is characterized in comprising:
  transmitting second information;
  herein, the second information is used to determine a second step-size; when the first timing offset value is not equal to the second timing offset value and the second count value is greater than 1, the first target power value, the second step-size and the second count value are used together to determine a transmit power value of the second signal; when the first timing offset value is not equal to the second timing offset value and the second count value is equal to 1, only the first target power value among the first target power value, the second step-size and the second count value is used to determine a transmit power value of the second signal.

According to one aspect of the present disclosure, the above method is characterized in comprising:
  transmitting a third signal;
  herein, the third signal is used to determine the reference timing; a timing offset between a timing for transmitting the first signal and the reference timing is equal to the first timing offset value, and a timing offset between a timing for transmitting the second signal and the reference timing is equal to the second timing offset value.

According to one aspect of the present disclosure, the above method is characterized in that a capability of a transmitter of the first signal is used to determine the first timing offset value.

According to one aspect of the present disclosure, the above method is characterized in comprising:
  transmitting third information;
  herein, when the first timing offset value is not equal to the second timing offset value, the second count value is equal to 1, and the third information is used to determine an upper limit of the first count value.

According to one aspect of the present disclosure, the above method is characterized in comprising:
  transmitting a fourth signal;
  herein, the fourth signal is used to indicate that a transmitter of the first signal can determine the first timing offset value according to its own capability, or the fourth signal is used to indicate that a transmitter of the first signal can determine the second timing offset value according to its own capability.

The present disclosure provides a first node for wireless communications, comprising:
  a first transceiver, transmitting a first signal, the first signal being used to initiate a random access; and
  a first transmitter, transmitting a second signal, the second signal being used to initiate a random access;
  herein, a target counter is used for counting in a random access initiated by the first node, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

The present disclosure provides a second node for wireless communications, comprising:
  a second transceiver, detecting a first signal, the first signal being used to initiate a random access; and
  a first receiver, detecting a second signal, the second signal being used to initiate a random access;
  herein, a target counter is used for counting in a random access initiated by a transmitter of the first signal, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the present disclosure has the following advantages over conventional schemes:

when calculating transmission times of a PRACH or a MsgA, transmission times of the PRACH or the MsgA adopting a timing offset pre-compensation will not be calculated into transmission times of the PRACH or the MsgA without adopting a timing offset pre-compensation; correspondingly, transmission times of the PRACH or the MsgA without adopting a timing offset pre-compensation will not be calculated into transmission times of the PRACH or the MsgA adopting a timing offset pre-compensation; the above methods ensure the accuracy of counting;

when the first node fails to transmit a PRACH or a MsgA for many times in a scenario where self-timing offset pre-compensation is applied, it indicates that a TA estimated by the first node may be inaccurate, or indicates a large collision on the selected PRACH resources rather than an unsuccessful random access due to insufficient transmit power; if the first node instead transmits a PRACH or a MsgA without adopting a timing offset pre-compensation at this time, the previously ramped power value needs to be recalculated to avoid interferences to other terminals and to reduce power consumption;

separate counting modes are adopted for the random access mode with and without timing offset pre-compensation, so as to ensure the accuracy of power ramping; different PRACH formats are configured for transmission modes of a PRACH with and without adopting a timing offset pre-compensation; since it is no longer necessary to distinguish a large TA when adopting a timing offset pre-compensation, a length of a sequence corresponding to an adopted PRACH format is short; and since it is necessary to distinguish a large TA when not adopting timing offset pre-compensation, a length of a sequence corresponding to an adopted PRACH format is long; the above method optimizes the PRACH configuration to avoid wasting too many long sequences;

different power ramping step-sizes are respectively configured for random access with and without a timing offset pre-compensation to optimize the selection of transmit power;

whether the first node can determine the first timing offset value based on its own capability and adopt the first timing offset value to transmit the first signal needs to be indicated and allowed by the base station, so as to facilitate the allocation of PRACH resources by the base station.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
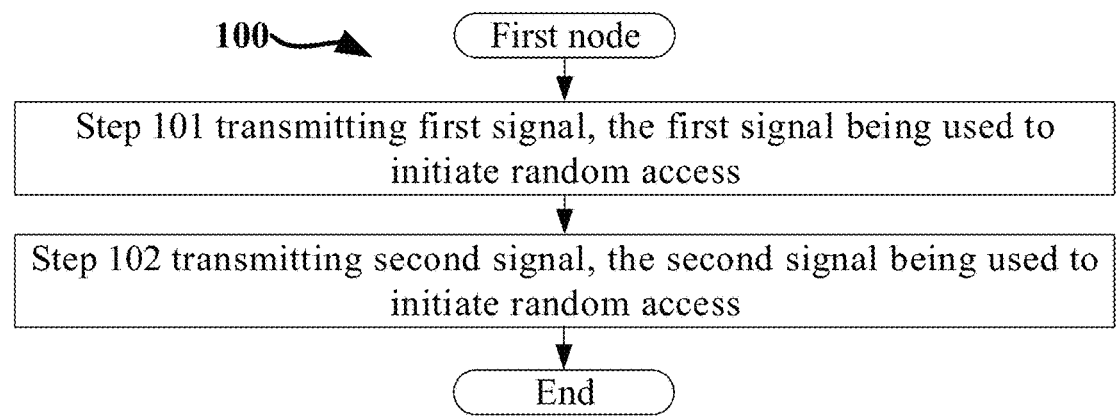
FIG. 1 illustrates a flowchart of the processing of a first node according to one embodiment of the present disclosure.

Embodiment 1 illustrates a flowchart of the processing of a first node, as shown in FIG. 1. In step 100 illustrated by FIG. 1, each box represents a step. In embodiment 1, a first node in the present disclosure transmits a first signal in step 101, and the first signal is used to initiate a random access; transmits a second signal in step 102, the second signal is used to initiate a random access.

In embodiment 1, a target counter is used for counting in a random access initiated by the first node, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the first signal comprises a PRACH.
In one embodiment, the second signal comprises a PRACH.
In one embodiment, the first signal comprises a MsgA.
In one embodiment, the second signal comprises a MsgA.
In one embodiment, the first signal comprises a Physical Uplink Shared Channel (PUSCH).

In one embodiment, the second signal comprises a PUSCH.

In one embodiment, both the first signal and the second signal comprise a PRACH.

In one embodiment, both the first signal and the second signal comprise a MsgA.

In one embodiment, the first count value is a positive integer.

In one embodiment, the second count value is a positive integer.

In one embodiment, a timing for transmitting the first signal comprises a time-domain position of a boundary of a radio frame occupied by the first signal.

In one embodiment, a timing for transmitting the second signal comprises a time-domain position of a boundary of a radio frame occupied by the second signal.

In one embodiment, a timing for transmitting the first signal comprises a time-domain position of a boundary of a radio frame occupied by the first signal.

In one embodiment, a timing for transmitting the second signal comprises a time-domain position of a boundary of a radio frame occupied by the second signal.

In one embodiment, the first timing offset value is equal to 0.

In one embodiment, the first timing offset value is equal to N_TA, and the N_TA is measured by milliseconds (ms).

In one embodiment, the first timing offset value comprises N_TA, and the N_TA is measured by milliseconds.

In one subembodiment of the above two embodiments, the N_TA is a TA of an uplink transmission from the first node to the second node in the present disclosure estimated by the first node.

In one subembodiment of the above two embodiments, the N_TA is greater than 0.

In one embodiment, the second timing offset value is equal to 0.

In one embodiment, the second timing offset value is equal to N_TA, and the N_TA is measured by milliseconds.

In one embodiment, the second timing offset value comprises N_TA, and the N_TA is measured by milliseconds.

In one subembodiment of the above two embodiments, the N_TA is a TA of an uplink transmission from the first node to the second node in the present disclosure estimated by the first node.

In one subembodiment of the above two embodiments, the N_TA is greater than 0.

In one embodiment, the first node has a Global Navigation Satellite System (GNSS) capability.

In one embodiment, the first node has an uplink synchronization pre-compensation capability.

In one embodiment, the first node has a capability to self-estimate an uplink TA and perform an uplink synchronization pre-compensation.

In one embodiment, the meaning of the above phrase of an initiated random access being unsuccessful includes: the first node does not receive a feedback for the first signal in a given time window after transmitting the first signal.

In one embodiment, the meaning of the above phrase of an initiated random access being unsuccessful includes: the first node does not receive a MsgB for the first signal in a given time window after transmitting the first signal.

In one subembodiment of the embodiment, the given time window is configured through an ra-Response Window.

In one subembodiment of the embodiment, the feedback of the first signal is a Random Access Response.

In one subembodiment of the embodiment, the feedback of the first signal comprises a MsgB.

In one embodiment, the meaning of the above phrase of an initiated random access being unsuccessful includes: the first node receives a first feedback in a given time window after transmitting the first signal, and a Medium Access Control (MAC) sub-Protocol Data Unit (subPDU) carried by the first feedback comprises a Backoff indication.

In one embodiment, the meaning of the above phrase of an initiated random access being unsuccessful includes: the first node receives a first feedback in a given time window after transmitting the first signal, and a MAC subPDU carried by the first feedback cannot find a Random Access Preamble identifier the same as a PREAMBLE_INDEX adopted by the first signal.

In one embodiment, the first node in the present disclosure is in an RRC_IDLE state from transmitting the first signal to transmitting the second signal.

In one embodiment, the first node in the present disclosure is in an out-of-synchronization state from transmitting the first signal to transmitting the second signal.

In one embodiment, the first timing offset value is not equal to 0, and the first timing offset value is related to a type of the second node in the present disclosure.

In one subsidiary embodiment of the subembodiment, a type corresponding to the second node is one of a Geostationary Earth Orbiting (GEO) satellite, a Medium Earth Orbiting (MEO) satellite, a Low Earth Orbit (LEO) satellite, a Highly Elliptical Orbiting (HEO) satellite, or an Airborne Platform.

In one embodiment, the first timing offset value is not equal to 0, and the first timing offset value is related to a height of the second node in the present disclosure.

In one embodiment, the first timing offset value is not equal to 0, and the first timing offset value is related to position information of the first node.

In one embodiment, the second timing offset value is not equal to 0, and the second timing offset value is related to a type of the second node in the present disclosure.

In one subsidiary embodiment of the subembodiment, a type corresponding to the second node is one of a GEO satellite, an MEO satellite, an LEO satellite, an HEO satellite, or an Airborne Platform.

In one embodiment, the second timing offset value is not equal to 0, and the second timing offset value is related to a height of the second node in the present disclosure.

In one embodiment, the second timing offset value is not equal to 0, and the second timing offset value is related to position information of the first node.

In one embodiment, the first signal is a radio signal.

In one embodiment, the first signal is a baseband signal.

In one embodiment, the second signal is a radio signal.

In one embodiment, the second signal is a baseband signal.

In one embodiment, the first node determines the first timing offset by itself.

In one embodiment, the first node determines the second timing offset by itself.

In one embodiment, the first signal comprises a PRACH in four-step RACH.

In one embodiment, the second signal comprises a PRACH in four-step RACH.

In one embodiment, the first signal comprises a Preamble in two-step RACH.

In one embodiment, the second signal comprises a Preamble in two-step RACH.

In one embodiment, the first signal comprises a MsgA in two-step RACH.

In one embodiment, the second signal comprises a MsgA in two-step RACH.

In one embodiment, a first sequence is used to generate the first signal, and the first sequence is a pseudo-random sequence.

In one embodiment, a first sequence is used to generate the first signal, and the first sequence is generated by a Gold sequence of 31-length.

In one embodiment, a second sequence is used to generate the second signal, and the second sequence is a pseudo-random sequence.

In one embodiment, a second sequence is used to generate the second signal, and the second sequence is generated by a Gold sequence of 31-length.

Embodiment 2

Figure 2:
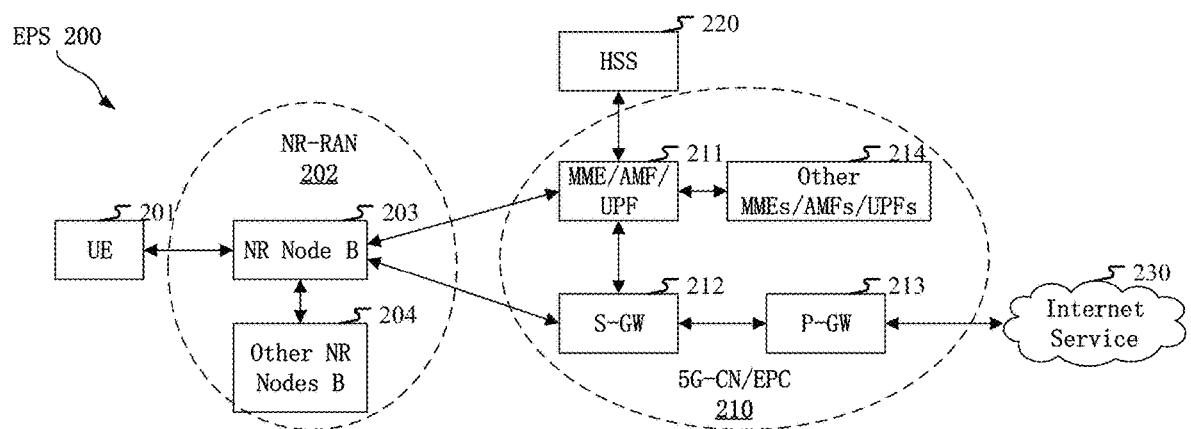
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the gNB 203 corresponds to the second node in the present disclosure.

In one embodiment, a radio interface between the UE 201 and the gNB203 is a Uu interface.

In one embodiment, a radio link between the UE 201 and the gNB 203 is a cellular link.

In one embodiment, a radio link between the gNB203 and a terrestrial station is a Feeder Link.

In one embodiment, the first node in the present disclosure is a terminal within the coverage of the gNB 203.

In one embodiment, the UE 201 supports transmission within NTN.

In one embodiment, the UE201 supports transmission in large latency networks.

In one embodiment, the gNB 203 supports transmission within NTN.

In one embodiment, the gNB203 supports transmission in large latency networks.

In one embodiment, the first node has a Global Positioning System (GPS) capability.

In one embodiment, the first node has a Global Navigation Satellite System (GNSS) capability.

In one embodiment, the first node has a BeiDou Navigation Satellite System (BDS) capability.

In one embodiment, the first node has a Galileo Satellite Navigation System (GALILEO) capability.

In one embodiment, the first node has a capability to perform an uplink synchronization pre-compensation.

In one embodiment, the first node has a capability to estimate an uplink TA by itself.

Embodiment 3

Figure 3:
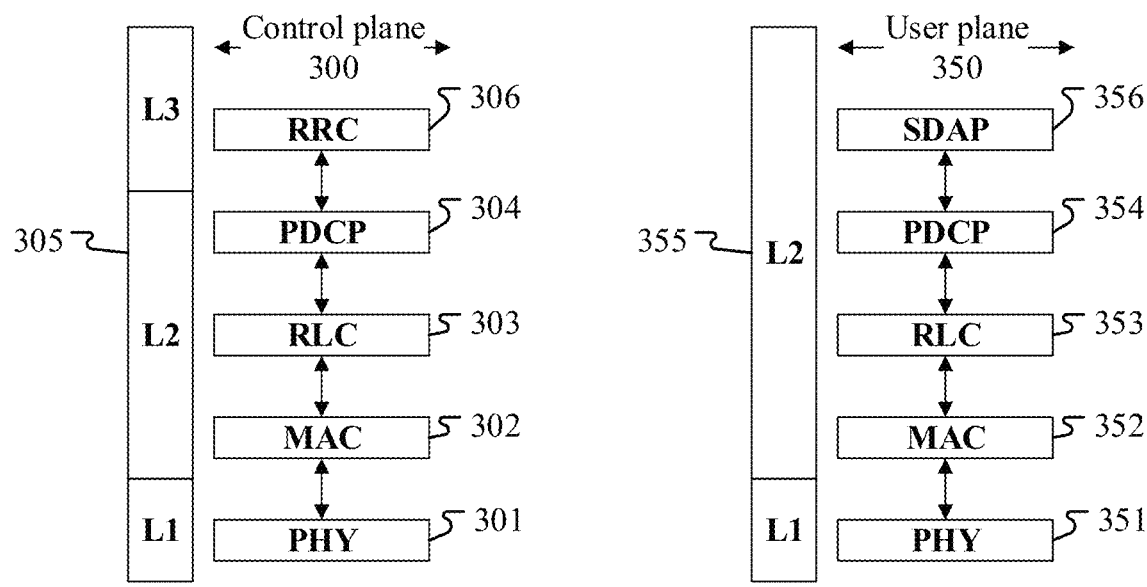
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 of the second communication node is used to generate scheduling of the first communication node.

In one embodiment, the PDCP 354 of the second communication node is used to generate scheduling of the first communication node.

In one embodiment, the first signal is generated by the PHY 301 or the PHY 351.

In one embodiment, the first signal is generated by the MAC 352 or the MAC 302.

In one embodiment, the second signal is generated by the PHY 301 or the PHY 351.

In one embodiment, the second signal is generated by the MAC 352 or the MAC 302.

In one embodiment, the first information is generated by the MAC 352 or the MAC 302.

In one embodiment, the first information is generated by the RRC 306.

In one embodiment, the second information is generated by the MAC 352 or the MAC 302.

In one embodiment, the second information is generated by the RRC 306.

In one embodiment, the third signal is generated by the PHY 301 or the PHY 351.

In one embodiment, the third signal is generated by the MAC 352 or the MAC 302.

In one embodiment, the third information is generated by the MAC 352 or the MAC 302.

In one embodiment, the third information is generated by the RRC 306.

In one embodiment, the fourth information is generated by the MAC 352 or the MAC 302.

In one embodiment, the fourth information is generated by the RRC 306.

In one embodiment, the fourth signal is generated by the PHY 301 or the PHY 351.

In one embodiment, the fourth signal is generated by the MAC 352 or the MAC 302.

In one embodiment, the fourth signal is generated by the RRC 306.

In one embodiment, the second node in the present disclosure transmits a positioning signal, and the first node in the present disclosure receives a positioning signal.

In one subembodiment of the embodiment, a transmission of the positioning signal is triggered by a Serving Mobile Location Center (SMLC).

In one subembodiment of the embodiment, a transmission of the positioning signal is triggered by an E-SMLC.

In one subembodiment of the embodiment, a transmission of the positioning signal is triggered by a SUPL Location Platform (SLP); herein, the SUPL is a Secure User Plane Location.

In one subembodiment of the embodiment, a transmission of the positioning signal is triggered by a Location Measurement Unit (LMU).

In one subembodiment of the embodiment, an operation of triggering a transmission of the positioning signal comes from the core network.

Embodiment 4

Figure 4:
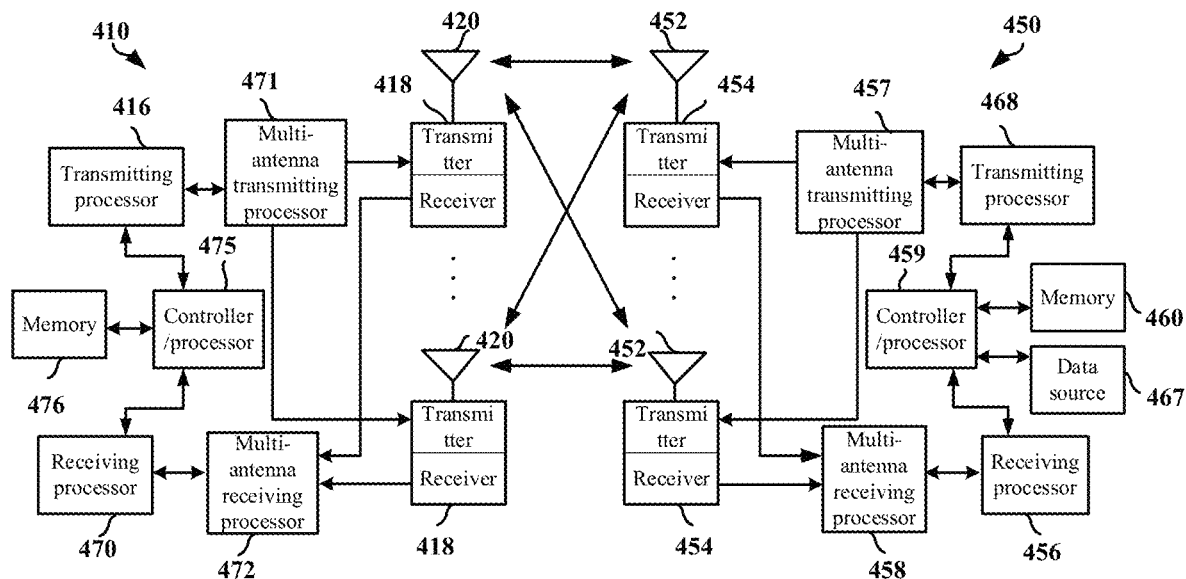
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communications with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least: transmits a first signal, the first signal is used to initiate a random access; and transmits a second signal, the second signal is used to initiate a random access; a target counter is used for counting in a random access initiated by the first node, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the first communication device 450 comprises at least one processor and at least one memory. a memory that stores a computer readable instruction program. The computer readable instruction program generates an action when executed by at least one processor. The action includes: transmitting a first signal, the first signal being used to initiate a random access; and transmitting a second signal, the second signal being used to initiate a random access; a target counter is used for counting in a random access initiated by the first node, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: detects a first signal, the first signal is used to initiate a random access; and detects a second signal, the second signal is used to initiate a random access; a target counter is used for counting in a random access initiated by a transmitter of the first signal, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the second communication device 410 comprises a memory that stores a computer readable instruction program. The computer readable instruction program generates an action when executed by at least one processor. The action includes: detecting a first signal, the first signal being used to initiate a random access; and detecting a second signal, the second signal being used to initiate a random access; a target counter is used for counting in a random access initiated by a transmitter of the first signal, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a terrestrial terminal.

In one embodiment, the first communication device 450 is a terrestrial device.

In one embodiment, the first communication device 450 is a nadir terminal.

In one embodiment, the first communication device 450 is an airplane.

In one embodiment, the first communication device 450 is an aircraft.

In one embodiment, the first communication device 450 is a surface vehicle.

In one embodiment, the second communication device 410 is a base station.

In one embodiment, the second communication device 410 is a non-terrestrial base station.

In one embodiment, the second communication device 410 is a GEO satellite.

In one embodiment, the second communication device 410 is an MEO satellite.

In one embodiment, the second communication device 410 is an LEO satellite.

In one embodiment, the second communication device 410 is an HEO satellite.

In one embodiment, the second communication device 410 is an Airborne Platform.

In one embodiment, at least first four of the antenna 452, the transmitter 454, the multi-antenna transmitting processor 457, the transmitting processor 468, and the controller/processor 459 are used to transmit a first signal; at least first four of the antenna 420, the receiver 418, the multi-antenna receiving processor 472, the receiving processor 470 and the controller/processor 475 are used to detect a first signal.

In one embodiment, at least first four of the antenna 452, the transmitter 454, the multi-antenna transmitting processor 457, the transmitting processor 468, and the controller/processor 459 are used to transmit a second signal; at least first four of the antenna 420, the receiver 418, the multi-antenna receiving processor 472, the receiving processor 470 and the controller/processor 475 are used to detect a second signal.

In one embodiment, at least first four of the antenna 452, the receiver 454, the multi-antenna receiving processor 458, the receiving processor 456 and the controller/processor 459 are used to receive first information; at least first four of the antenna 420, the transmitter 418, the multi-antenna transmitting processor 471, the transmitting processor 416 and the controller/processor 475 are used to transmit first information.

In one embodiment, at least first four of the antenna 452, the receiver 454, the multi-antenna receiving processor 458, the receiving processor 456 and the controller/processor 459 are used to receive second information; at least first four of the antenna 420, the transmitter 418, the multi-antenna transmitting processor 471, the transmitting processor 416 and the controller/processor 475 are used to transmit second information.

In one embodiment, at least first four of the antenna 452, the receiver 454, the multi-antenna receiving processor 458, the receiving processor 456 and the controller/processor 459 are used to receive a third signal; at least first four of the antenna 420, the transmitter 418, the multi-antenna transmitting processor 471, the transmitting processor 416 and the controller/processor 475 are used to transmit a third signal.

In one embodiment, at least first four of the antenna 452, the receiver 454, the multi-antenna receiving processor 458, the receiving processor 456 and the controller/processor 459 are used to receive third information; at least first four of the antenna 420, the transmitter 418, the multi-antenna transmitting processor 471, the transmitting processor 416 and the controller/processor 475 are used to transmit third information.

In one embodiment, at least first four of the antenna 452, the receiver 454, the multi-antenna receiving processor 458, the receiving processor 456 and the controller/processor 459 are used to receive a fourth signal; at least first four of the antenna 420, the transmitter 418, the multi-antenna transmitting processor 471, the transmitting processor 416 and the controller/processor 475 are used to transmit a fourth signal.

In one embodiment, at least one of the receiving processor 456 or the controller/processor 459 is used to determine the first timing offset value.

In one embodiment, at least one of the receiving processor 456 or the controller/processor 459 is used to determine the second timing offset value.

In one embodiment, at least one of the receiving processor 456 or the controller/processor 459 is used to determine the first count value.

In one embodiment, at least one of the receiving processor 456 or the controller/processor 459 is used to determine the second count value.

Embodiment 5

Figure 5:
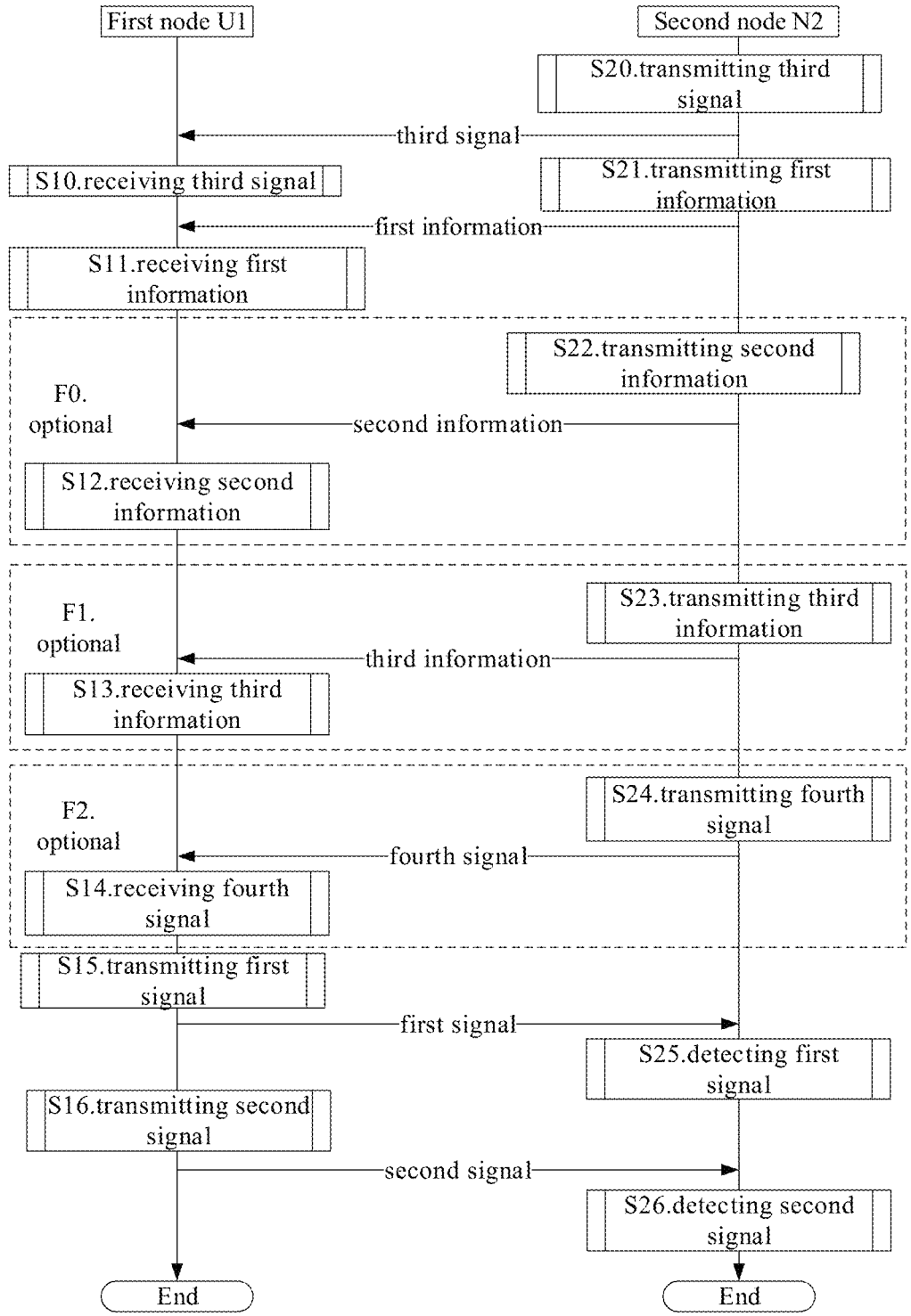
FIG. 5 illustrates a flowchart of a second signal according to one embodiment of the present disclosure.

Embodiment 5 illustrates a flowchart of a second signal, as shown in FIG. 5. In FIG. 5, a first node U1 and a second node N2 are in communications through a radio link; herein, steps in box F0, box F1 and box F2 are optional.

The first node U1 receives a third signal in step S10; receives first information in step S11; receives second information in step S12; receives third information in step S13; receives a fourth signal in step S14; transmits a first signal in step S15; transmits a second signal in step S16.

The second node N2 transmits a third signal in step S20; transmits first information in step S21; transmits second information in step S22; transmits third information in step S23; transmits a fourth signal in step S24; detects a first signal in step S25; detects a second signal in step S26.

In embodiment 5, the first signal is used to initiate a random access, and the second signal is used to initiate a random access; a target counter is used for counting in a random access initiated by the first node U1, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful; the first information is used to determine a first target power value and a first step-size; when the first count value is greater than 1, the first target power value, the first step-size and the first count value are used together to determine a transmit power value of the first signal; when the first count value is equal to 1, only the first target power value among the first target power value, the first step-size and the first count value is used to determine a transmit power value of the first signal; the second information is used to determine a second step-size; when the first timing offset value is not equal to the second timing offset value and the second count value is greater than 1, the first target power value, the second step-size and the second count value are used together to determine a transmit power value of the second signal; when the first timing offset value is not equal to the second timing offset value and the second count value is equal to 1, only the first target power value among the first target power value, the second step-size and the second count value is used to determine a transmit power value of the second signal; the third signal is used to determine the reference timing; a timing offset between a timing for transmitting the first signal and the reference timing is equal to the first timing offset value, and a timing offset between a timing for transmitting the second signal and the reference timing is equal to the second timing offset value; when the first timing offset value is not equal to the second timing offset value, the second count value is equal to 1, and the third information is used to determine an upper limit of the first count value; the fourth signal is used to indicate that the first node U1 can determine the first timing offset value according to its own capability, or the fourth signal is used to indicate that the first node U1 can determine the second timing offset value according to its own capability.

In one embodiment, when the first timing offset value is equal to the second timing offset value, the second count value is equal to the first count value plus 1; and when the first timing offset value is not equal to the second timing offset value, the second count value is not greater than the first count value.

In one subembodiment of the embodiment, when the first timing offset value is not equal to the second timing offset value, the second count value is equal to 1.

In one subembodiment of the embodiment, when the first timing offset value is equal to the second timing offset value, the first count value is equal M, and the second count value is equal to M+1, M being a positive integer.

In one subsidiary embodiment of the subembodiment, M is less than a maximum retransmission time of a PRACH.

In one subsidiary embodiment of the subembodiment, M is less than a maximum retransmission time of MsgA.

In one subembodiment of the embodiment, the meaning of the first timing offset value being equal to the second timing offset value includes: both the first timing offset value and the second timing offset value are equal to 0.

In one subembodiment of the embodiment, the meaning of the first timing offset value being equal to the second timing offset value includes: both the first timing offset value and the second timing offset value are equal to N_TA in the present disclosure.

In one subembodiment of the embodiment, the meaning of the first timing offset value being not equal to the second timing offset value includes: the first timing offset is equal to 0, and the second timing offset value is equal to N_TA.

In one subembodiment of the embodiment, the meaning of the first timing offset value being not equal to the second timing offset value includes: the second timing offset value is equal to 0, and the first timing offset value is equal to N_TA.

In one embodiment, a format adopted by the first signal is related to the first timing offset value, and a format adopted by the second signal is related to the second timing offset value; a format adopted by the first signal comprises at least one of a length of a sequence generating the first signal, a length of a cyclic prefix comprised in the first signal, or a blank length comprised in time-domain resources occupied by the first signal; a format adopted by the second signal comprises at least one of a length of a sequence generating the second signal, a length of a cyclic prefix comprised in the second signal, or a blank length comprised in time-domain resources occupied by the second signal.

In one subembodiment of the embodiment, the meaning of the above phrase of a format adopted by the first signal being related to the first timing offset value includes: a format adopted by the first signal is a first format, the first format is a format in a first format set, the first format set comprises one or a plurality of formats, and the first node U1 generates the first signal by adopting a first format in the first format set when transmitting the first signal with the first timing offset value.

In one subembodiment of the embodiment, the meaning of the above phrase of a format adopted by the first signal being related to the first timing offset value includes: a format adopted by the first signal is a first format, the first format is a format in a first format set, the first format set comprises one or a plurality of formats, and the first format set is associated with the first timing offset value.

In one subembodiment of the embodiment, the meaning of the above phrase of a format adopted by the second signal being related to the second timing offset value includes: a format adopted by the second signal is a second format, the second format is a format in a second format set, the second format set comprises one or a plurality of formats, and the first node generates the second signal by adopting a second format in the second format set when transmitting the second signal with the second timing offset value.

In one subembodiment of the embodiment, the meaning of the above phrase of a format adopted by the second signal being related to the second timing offset value includes: a format adopted by the second signal is a second format, the second format is a format in a second format set, the second format set comprises one or a plurality of formats, and the second format set is associated with the second timing offset value.

In one subembodiment of the embodiment, the first format and the second format in the present disclosure respectively correspond to different generation sequence lengths.

In one subembodiment of the embodiment, the first format and the second format in the present disclosure respectively correspond to different cyclic prefix lengths.

In one subembodiment of the embodiment, the first format and the second format in the present disclosure respectively occupy different blank lengths.

In one embodiment, a signaling carrying the first information is an RRC signaling.

In one embodiment, the first information is carried by an Information Element (IE) RACH-ConfigGeneric in TS 38.331.

In one embodiment, the first target power value comprises preambleReceivedTargetPower in TS 38.331.

In one embodiment, the first target power value comprises DELTA_PREAMBLE in TS 38.321.

In one embodiment, the first target power value is measured by dBm.

In one embodiment, the first target power value is measured by watt.

In one embodiment, the first target power value is measured by milliwatt.

In one embodiment, the first target power value is measured by dB.

In one embodiment, the first step-size comprises PREAMBLE_POWER_RAMPINGSTEP in TS 38.321.

In one embodiment, the first step-size comprises powerRampingStep in TS 38.331.

In one embodiment, the first step-size is measured by dB.

In one embodiment, the first count value comprises PREAMBLE_POWER_RAMPING_COUNTER in TS 38.321.

In one embodiment, the first target power value is related to the first timing offset value.

In one embodiment, the first target power value is related to the second timing offset value.

In one embodiment, the first target power value is related to a type of the second node N2.

In one embodiment, the first target power value is related to a height of the second node N2.

In one embodiment, the first step-size is related to the first timing offset value.

In one embodiment, the first step-size is related to a type of the second node N2.

In one embodiment, the first step-size is related to a height of the second node N2.

In one embodiment, when the first counter is greater than 1, a transmit power value of the first signal is a smaller value between a first maximum power value and a first power value, the first power value is linearly associated with the first target power value, and the first power value is linearly associated with a product of the first step-size and the first count value.

In one subembodiment of the embodiment, the first maximum power value comprises $P_{CMAX,f,c}(i)$ in TS 38.213.

In one subembodiment of the embodiment, the first power value is equal to a sum of the first target power value, DELTA_PREAMBLE and a first path-loss value, and the first path-loss comprises $PL_{b,f,c}$ in TS 38.213.

In one subembodiment of the embodiment, the first power value is $P_1$, the $P_1$ is determined through following formula:

$$P_1 = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + PL_{b,f,c}$$

herein,
preambleReceivedTargetPower is the first target power value,
PREAMBLE_POWER_RAMPING_COUNTER is the first count value,
$PL_{b,f,c}$ corresponds to a path-loss from the first node U1 to the second node N2, PREAMBLE_POWER_RAMPING_STEP is the first step-size.

In one embodiment, when the first counter is equal than 1, a transmit power value of the first signal is a smaller value between a first maximum power value and a first power value, and the first power value is linearly associated with the first target power value.

In one subembodiment of the embodiment, the first maximum power value comprises $P_{CMAX,f,c}(i)$ in TS 38.213.

In one subembodiment of the embodiment, the first power value is equal to a sum of the first target power value, DELTA_PREAMBLE and a first path-loss value, and the first path-loss comprises $PL_{b,f,c}$ in TS 38.213.

In one subembodiment of the embodiment, the first power value is $P_1$, the $P_1$ is determined through following formula:

$$P_1 = \text{preambleReceivedTargetPower} + \text{DELTA\_PREAMBLE} + PL_{b,f,c}$$

herein, preambleReceivedTargetPower is the first target power value, $PL_{b,f,c}$ corresponds to a path-loss from the first node U1 to the second node N2.

In one embodiment, when the first timing offset value is equal to the second timing offset value, the first target power value, the first step-size and the second count value are used together to determine a transmit power value of the second signal.

In one subembodiment of the embodiment, when the first timing offset value is equal to the second timing offset value, the second count value is equal to the first count value plus 1.

In one subembodiment of the embodiment, when the first timing offset value is equal to the second timing offset value, the first signal and the second signal follows a same power ramping process.

In one subembodiment of the embodiment, when the first timing offset value is equal to the second timing offset value, the second count value is related to the first count value.

In one subembodiment of the embodiment, when the first timing offset value is equal to the second timing offset value, the first signal and the second signal shares the target counter.

In one subembodiment of the embodiment, when the first timing offset value and the second timing offset value are equal, a transmit power value of the second signal is a smaller value between a first maximum power value and a second power value, the second power value is linearly associated with the first target power value, and the second power value is linearly associated with a product of the first step-size and the second count value.

In one subsidiary embodiment of the subembodiment, the first maximum power value comprises $P_{CMAX,f,c}(i)$ in TS 38.213.

In one subsidiary embodiment of the subembodiment, the first power value is equal to a sum of the first target power value, DELTA_PREAMBLE and a first path-loss value, and the first path-loss comprises $PL_{b,f,c}$ in TS 38.213.

In one subsidiary embodiment of the subembodiment, the second power value is $P_2$, the $P_2$ is determined through following formula:

$$P_2 = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + PL_{b,f,c}$$

herein, preambleReceivedTargetPower is the first target power value,

PREAMBLE_POWER_RAMPING_COUNTER is the second count value, $PL_{b,f,c}$ corresponds to a path-loss from the first node U1 to the second node N2, PREAMBLE_POWER_RAMPING_STEP is the first step-size.

In one embodiment, a signaling carrying the second information in an RRC signaling.

In one embodiment, when the first timing offset value is not equal to the second timing offset value and the second count value is greater than 1, the second count value does not count a transmission of the first signal.

In one embodiment, when the first timing offset value is not equal to the second timing offset value and the second count value is greater than 1, the second count value is unrelated to the first count value.

In one embodiment, the first count value and the second count value are respectively for a random access power ramping count value when the terminal adopts an advanced compensation TA and a random access power ramping count value when the terminal does not adopt an advanced compensation TA.

In one embodiment, when the first timing offset value is not equal to the second timing offset value, and when the second count value is greater than 1, a transmit power value of the second signal is a smaller value between a first maximum transmit power and a second power value, the second power value is linearly associated with the first target power value, and the second power value is linearly associated with a product of the second step-size and the second count value.

In one subembodiment of the embodiment, the first maximum power value comprises $P_{CMAX,f,c}(i)$ in TS 38.213.

In one subembodiment of the embodiment, the second power value is equal to a sum of the first target power value, DELTA_PREAMBLE and a first path-loss value, and the first path-loss comprises $PL_{b,f,c}$ in TS 38.213.

In one subembodiment of the embodiment, the second power value is $P_2$, the $P_2$ is determined through following formula:

$$P_2 = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + PL_{b,f,c}$$

herein, preambleReceivedTargetPower is the first target power value,

PREAMBLE_POWER_RAMPING_COUNTER is the second count value, $PL_{b,f,c}$ corresponds to a path-loss from the first node to the second node, PREAMBLE_POWER_RAMPING_STEP is the second step-size.

In one embodiment, when the first timing offset value is not equal to the second timing offset value, and when the second count value is equal to 1, a transmit power value of the second signal is a smaller value between a first maximum transmit power and a second power value, and the second power value is linearly associated with the first target power value.

In one subembodiment of the embodiment, the first maximum power value comprises $P_{CMAX,f,c}(i)$ in TS 38.213.

In one subembodiment of the embodiment, the second power value is equal to a sum of the first target power value, DELTA_PREAMBLE and a first path-loss value, and the first path-loss comprises $PL_{b,f,c}$ in TS 38.213.

In one subembodiment of the embodiment, the second power value is $P_2$ the $P_2$ is determined through following formula:

$$P_2 = \text{preambleReceivedTargetPower} + \text{DELTA\_PRE-AMBLE} + PL_{b,f,c}$$

herein, preambleReceivedTargetPower is the first target power value, $PL_{b,f,c}$ corresponds to a path-loss from the first node U1 to the second node N2.

In one embodiment, the third signal is a radio signal.

In one embodiment, the third signal is a baseband signal.

In one embodiment, the third signal is synchronization signal.

In one embodiment, the third signal comprises a Primary Synchronization Signal (PSS).

In one embodiment, the third signal comprises a Secondary Synchronization Signal (SSS).

In one embodiment, the third signal comprises a SS/PBCH Block (SSB).

In one embodiment, a start time of time-domain resources reserved for transmitting the first signal determined by the first node U1 according to the reference timing is a first candidate time, a start time of time-domain resources occupied by the first node U1 actually transmitting the first signal is a first time, and a time interval between the first time and the first candidate time is equal to the first timing offset value.

In one embodiment, a start time of time-domain resources reserved for transmitting the second signal determined by the first node U1 according to the reference timing is a second candidate time, a start time of time-domain resources occupied by the first node U1 actually transmitting the second signal is a second time, and a time interval between the second time and the second candidate time is equal to the second timing offset value.

In one embodiment, the reference timing is a downlink timing.

In one embodiment, the reference timing comprises a boundary of a radio frame.

In one embodiment, the reference timing comprises a boundary of a slot in a radio frame.

In one embodiment, the determining the reference timing comprises determining a downlink System Frame Number (SFN).

In one embodiment, the determining the reference timing determines a boundary of a downlink slot.

In one embodiment, the determining the reference timing comprises determining a boundary of a downlink OFDM symbol.

In one embodiment, a capability of the first node U1 is used to determine the first timing offset value.

In one embodiment, a capability of the first node U1 is used to determine the second timing offset value.

In one embodiment, a capability of the first node U1 comprises a positioning capability of the first node U1.

In one embodiment, a capability of the first node U1 comprises an uplink synchronization pre-compensation capability of the first node U1.

In one embodiment, a capability of the first node U1 comprises a capability of the first node U1 to estimate an uplink TA by itself.

In one embodiment, a capability of the first node U1 comprises: the first node U1 determines a capability to perform an uplink synchronization pre-compensation according to a positioning result.

In one embodiment, the meaning of the above phrase of a capability of the first node U1 being used to determine the first timing offset value includes: the first node U1 determines the first timing offset value according to an uplink synchronization pre-compensation capability.

In one embodiment, the meaning of the above phrase of a capability of the first node U1 being used to determine the first timing offset value includes: the first node determines the first timing offset value according to a self-estimated uplink TA.

In one embodiment, a capability of the first node U1 comprises a positioning capability of the first node U1.

In one embodiment, a capability of the first node U1 comprises a pre-compensation capability of the first node U1 for timing.

In one embodiment, a capability of the first node U1 comprises a positioning accuracy of the first node U1.

In one embodiment, a capability of the first node U1 comprises whether the first node U1 supports a Global Navigation Satellite System (GNSS).

In one embodiment, a capability of the first node U1 comprises a computing capability of the first node U1 for a transmission distance between the first node U1 and the second node N2 in the present disclosure.

In one embodiment, a capability of the first node U1 comprises a computing capability of the first node U1 for a transmission delay between the first node U1 and the second node N2 in the present disclosure.

In one embodiment, a capability of the first node U1 comprises a pre-compensation capability of the first node U1 for a transmission delay between the first node U1 and the second node N2 in the present disclosure.

In one embodiment, Reference Signal Received Power (RSRP) of a radio signal from the second node N2 determined by the first node U1 is used to determine the first timing offset value.

In one subembodiment of the embodiment, the RSRP and a capability of the first node are used together to determine the first timing offset value.

In one subembodiment of the embodiment, the radio signal from the second node N2 comprises a Channel State Information Reference Signal (CSI-RS) transmitted by the second node N2.

In one embodiment, the third information is carried by an RRC signaling.

In one embodiment, the upper limit of the first count value is a positive integer greater than 1.

In one embodiment, when the first count value reaches an upper limit, the first count value is reset to 1.

In one embodiment, the upper limit of the second count value is a positive integer greater than 1.

In one embodiment, when the second count value reaches an upper limit, the second count value is reset to 1.

In one embodiment, the second node N2 detects that the first signal comprises that the second node N2 correctly receives the first signal.

In one embodiment, after detecting the first signal, the second node N2 does not transmit a feedback for the first signal in the given time window in the present disclosure.

In one embodiment, the detecting a first signal comprises not correctly receiving the first signal.

In one embodiment, after detecting the first signal, the second node N2 does not transmit a MsgB for the first signal in the given time window in the present disclosure.

In one embodiment, after detecting the first signal, the second node N2 transmits a first feedback in the given time window in the present disclosure, and a MAC subPDU carried by the first feedback comprises a Backoff indication.

In one embodiment, after detecting the first signal, the second node N2 transmits a first feedback in the given time window in the present disclosure, and a MAC subPDU carried by the first feedback comprises a Backoff indication.

In one embodiment, after detecting the first signal, the second node N2 transmits a first feedback in the given time window in the present disclosure, and a Random Access Preamble identifier the same as a PREAMBLE_INDEX adopted by the first signal cannot be found in a MAC subPDCU carried by the first feedback.

In one embodiment, the second node N2 detects that the second signal comprises that the second node N2 correctly receives the second signal.

In one embodiment, the second node N2 detects that the second signal comprises that the second node N2 does not correctly receive the second signal.

In one embodiment, the second node N2 is a satellite.

In one embodiment, the second node N2 is a base station used for non-terrestrial communications.

In one embodiment, the first node U1 determines the first timing offset value according position information of the first node U1.

In one embodiment, the first node U1 determines the second timing offset value according position information of the first node U1.

In one embodiment, position information of the first node U1 in the present disclosure includes: a longitude and latitude of the first node U1 when transmitting the first signal.

In one embodiment, position information of the first node U1 in the present disclosure includes: a distance between the first node U1 when transmitting the first signal and a projection point of the second node N2 on the earth's surface.

In one embodiment, position information of the first node U1 in the present disclosure includes: a distance between the first node U1 when transmitting the first signal and the second node N2.

In one embodiment, in the process from a count value of the target counter being equal to the first count value to a count value of the target counter being equal to the second count value, the target counter is not suspended.

In one embodiment, from a time for transmitting the first signal to a start time for transmitting the second signal, the target counter is not suspended.

In one embodiment, in the process from a count value of the target counter being equal to the first count value to a count value of the target counter being equal to the second count value, the first node does not receive a notification of suspending the target counter from a lower layer.

In one embodiment, from a start time for transmitting the first signal to a start time for transmitting the second signal, the first node does not receive a notification of suspending the target counter from a lower layer.

In one embodiment, in the process from a count value of the target counter being equal to the first count value to a count value of the target counter being equal to the second count value, the first signal and the second signal are both associated with a same SSB or a same CSI-RS.

In one embodiment, from a start time for transmitting the first signal to a start time for transmitting the second signal, the first signal and the second signal are both associated with a same SSB or a same CSI-RS.

In one embodiment, in the process from a count value of the target counter being equal to the first count value to a count value of the target counter being equal to the second count value, the first node does not receive a notification of suspending the target counter from a lower layer, and both the first signal and the second node are associated with a same SSB or a same CSI-RS.

In one embodiment, from a start time for transmitting the first signal to a start time for transmitting the second signal, the first node does not receive a notification of suspending the target counter from a lower layer, and the first signal and the second signal are both associated with a same SSB or a same CSI-RS.

Embodiment 6

Figure 6:
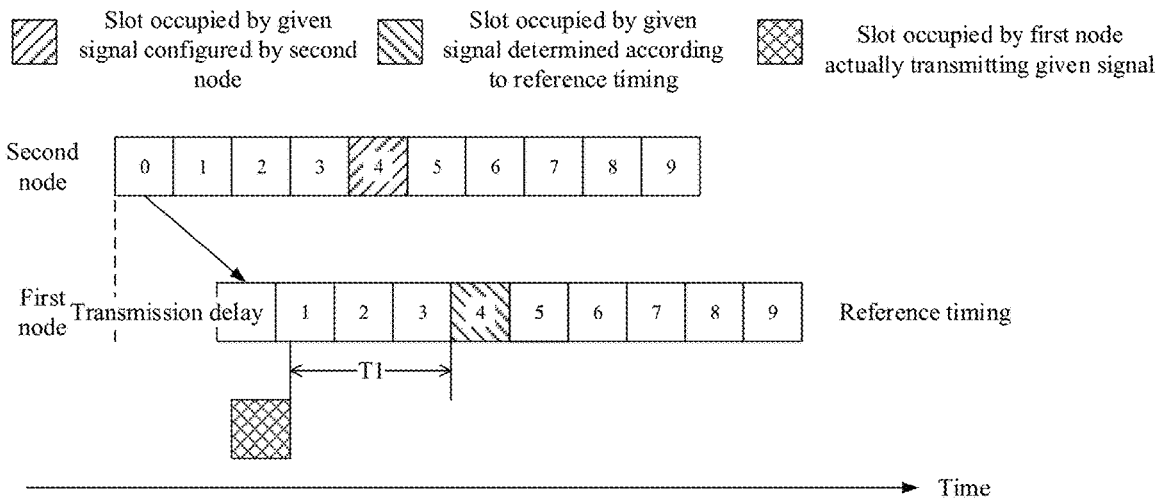
FIG. 6 illustrates a schematic diagram of a given timing offset value according to one embodiment of the present disclosure.

Embodiment 6 illustrates a schematic diagram of a given timing offset value, as shown in FIG. 6. In FIG. 6, the first node has a positioning capability, and the first node has an uplink TA pre-compensation capability; the first node estimates a TA of an uplink transmission from the first node to the second node in the present disclosure by itself, and the TA is equal to the given timing offset value.

As shown in the figure, in one embodiment, a start time of a slot reserved for transmitting a given signal determined by the first node according to the reference timing is a first candidate time, a start time of a slot occupied by the first node for actually transmitting the given signal is a first time, and a time interval between the first time and the first candidate time is equal to the given timing offset value; the square in the figure identifies a slot, and a number in the square represents a slot number; T1 identified in the figure corresponds to the given timing offset value.

In one embodiment, the given timing offset value is the first timing offset value in the present disclosure, and the given signal is the first signal.

In one embodiment, the given timing offset value is the second timing offset value in the present disclosure, and the given signal is the second signal.

In one embodiment, the given timing offset value is measured by milliseconds.

In one embodiment, a duration of the given timing offset value in time domain is equal to a duration of a positive integer number of slot(s).

In one embodiment, a duration of the given timing offset value in time domain is equal to a duration of a positive integer number of consecutive multicarrier symbol(s).

Embodiment 7

Figure 7:
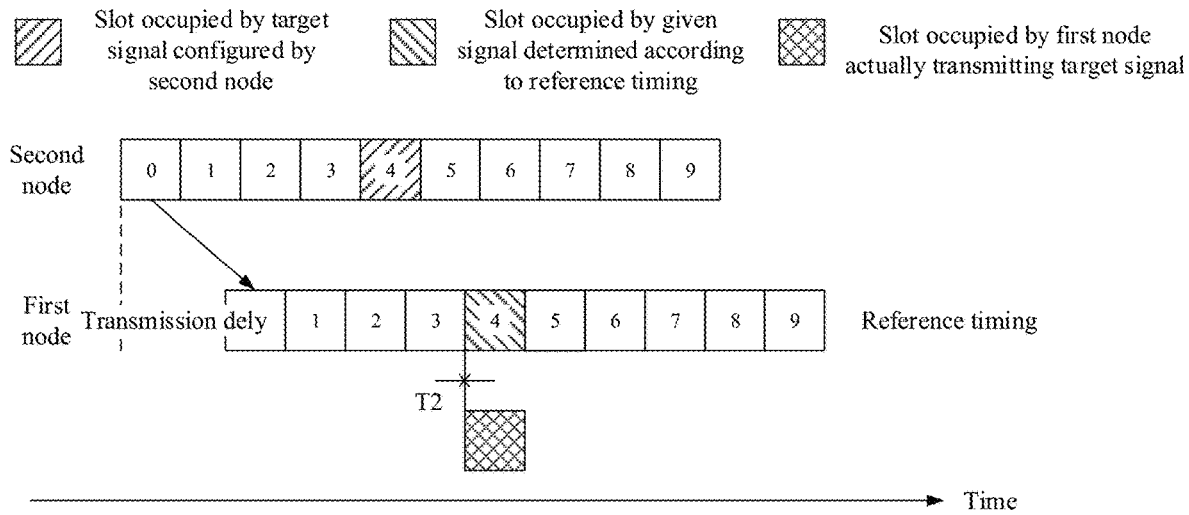
FIG. 7 illustrates a schematic diagram of a target timing offset value according to one embodiment of the present disclosure.

Embodiment 7 illustrates a schematic diagram of a target timing offset value, as shown in FIG. 7. In FIG. 7, a start time of a slot reserved for transmitting the target signal determined by the first node according to a reference timing is a second candidate time, a start time of a slot occupied by the first node for actually transmitting the target signal is a second time, and a time interval between the second time and the second candidate time is equal to the target timing offset value; the square in the figure identifies a slot, and a number in the square represents a slot number; T2 identified in the figure corresponds to the target timing offset value, and T2 is equal to 0.

In one embodiment, the target timing offset value is the first timing offset value in the present disclosure, and the given signal is the first signal.

In one embodiment, the target timing offset value is the second timing offset value in the present disclosure, and the given signal is the second signal.

Embodiment 8

Figure 8:
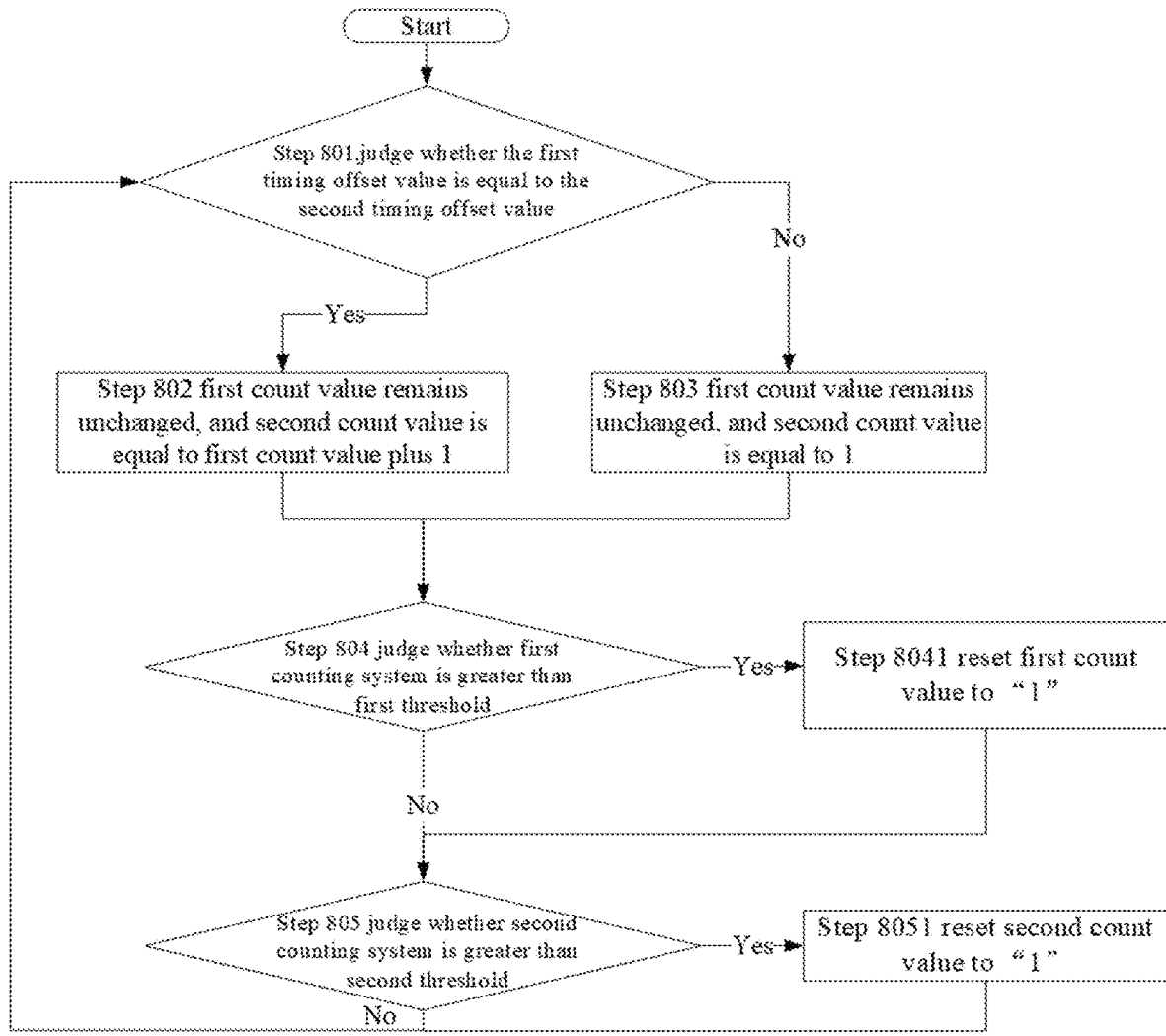
FIG. 8 illustrates a flowchart of a target counter according to one embodiment of the present disclosure.

Embodiment 8 illustrates a flowchart of a target counter according to the present disclosure, as shown in FIG. 8. In FIG. 8, the first node executes the following steps:
- in step 801, judge whether the first timing offset value is equal to the second timing offset value, if "yes", go to step 802; if "no", go to step 803;
- in step 802, a first count value remains unchanged, and a second count value is equal to a first count value plus 1;
- in step 803, a first count value remains unchanged, and a second count value is equal to 1;
- in step 804, judge whether a first counting system is greater than a first threshold; if "yes", go to step 8041; if "no", go to step 805; reset a first counter value to "1" in step 8041, and go to step 805;
- in step 805, judge whether a second counting system is greater than a second threshold; if "yes", go to step 8051; if "no", go to step 801; reset a first count value to "1" in step 8051, and go to step 801.

In one embodiment, the first threshold is an upper limit of the first count value.

In one embodiment, the second threshold value is an upper limit value of the second count value.

In one embodiment, the first threshold is configured by a higher-layer signaling.

In one embodiment, the first threshold is configured by an RRC signaling.

In one embodiment, the second threshold is configured by a higher-layer signaling.

In one embodiment, the second threshold is configured by an RRC signaling.

In one embodiment, the target counter comprises a first sub-counter and a second sub-counter, the first sub-counter is used for counting of the first count value, and the second sub-counter is used for counting of the second count value.

Embodiment 9

Figure 9:
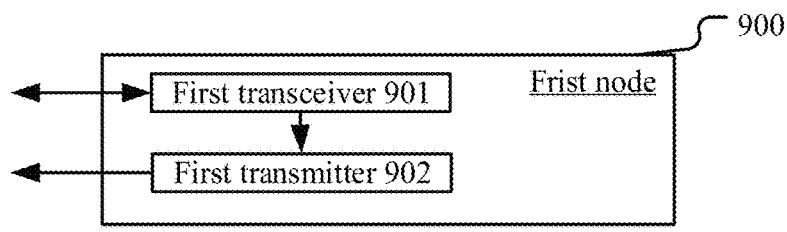
FIG. 9 illustrates a structure block diagram in a first node according to one embodiment of the present disclosure.

Embodiment 9 illustrates a structure block diagram in a first node, as shown in FIG. 9. In FIG. 9, a first node 900 comprises a first transceiver 901 and a first transmitter 902.

the first transceiver 901 transmits a first signal, and the first signal is used to initiate a random access;

the first transmitter 902 transmits a second signal, and the second signal is used for a random access;

In embodiment 9, a target counter is used for counting in a random access initiated by the first node, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, when the first timing offset value is equal to the second timing offset value, the second count value is equal to the first count value plus 1; and when the first timing offset value is not equal to the second timing offset value, the second count value is not greater than the first count value.

In one embodiment, a format adopted by the first signal is related to the first timing offset value, and a format adopted by the second signal is related to the second timing offset value; a format adopted by the first signal comprises at least one of a length of a sequence generating the first signal, a length of a cyclic prefix comprised in the first signal, or a blank length comprised in time-domain resources occupied by the first signal; a format adopted by the second signal comprises at least one of a length of a sequence generating the second signal, a length of a cyclic prefix comprised in the second signal, or a blank length comprised in time-domain resources occupied by the second signal.

In one embodiment, the first transceiver 901 receives first information; the first information is used to determine a first target power value and a first step-size; when the first count value is greater than 1, the first target power value, the first step-size and the first count value are used together to determine a transmit power value of the first signal; when the first count value is equal to 1, only the first target power value among the first target power value, the first step-size and the first count value is used to determine a transmit power value of the first signal.

In one embodiment, when the first timing offset value is equal to the second timing offset value, the first target power value, the first step-size and the second count value are used together to determine a transmit power value of the second signal.

In one embodiment, the first transceiver 901 receives second information; the second information is used to determine a second step-size; when the first timing offset value is not equal to the second timing offset value and the second count value is greater than 1, the first target power value, the second step-size and the second count value are used together to determine a transmit power value of the second signal; when the first timing offset value is not equal to the second timing offset value and the second count value is equal to 1, only the first target power value among the first target power value, the second step-size and the second count value is used to determine a transmit power value of the second signal.

In one embodiment, the first transceiver 901 receives a third signal; the third signal is used to determine the reference timing; a timing offset between a timing for transmitting the first signal and the reference timing is equal to the first timing offset value, and a timing offset between a timing for transmitting the second signal and the reference timing is equal to the second timing offset value.

In one embodiment, a capability of the first node is used to determine the first timing offset value.

In one embodiment, the first transceiver 901 receives third information; when the first timing offset value is not equal to the second timing offset value, the second count value is equal to 1, and the third information is used to determine an upper limit of the first count value.

In one embodiment, the first transceiver 901 receives a fourth signal; and the fourth signal is used to indicate that the first node can determine the first timing offset value according to its own capability.

In one embodiment, the first transceiver 901 comprises at least first six of the antenna 452, the receiver/transmitter 454, the multi-antenna receiving processor 458, the receiving processor 456, the multi-antenna transmitting processor 457, the transmitting processor 468, and the controller/processor 459 in embodiment 4.

In one embodiment, the first transmitter 902 comprises at least the first four of the antenna 452, the transmitter 454, the multi-antenna transmitting processor 457, the transmitting processor 468 and the controller/processor 459 in embodiment 4.

Embodiment 10

Figure 10:
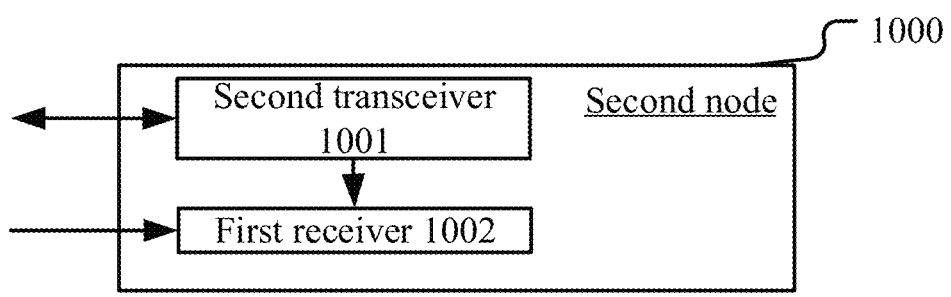
FIG. 10 illustrates a structure block diagram in a second node according to one embodiment of the present disclosure.

Embodiment 10 illustrates a structure block diagram in a second node, as shown in FIG. 10. In FIG. 10, a second node 1000 comprises a second transceiver 1001 and a first receiver 1002.

the second transceiver 1001 detects a first signal, the first signal is used to initiate a random access;

the first receiver 1002 detects a second signal, and the second signal is used to initiate a random access;

In embodiment 10, a target counter is used for counting in a random access initiated by a transmitter of the first signal, and a count value of the target counter is a positive integer; a count value of the target counter when transmitting the first signal is a first count value, and a count value of the target counter when transmitting the second signal is a second count value; a first timing offset value is used to determine a timing for transmitting the first signal, and a second timing offset value is used to determine a timing for transmitting the second signal; whether the first timing offset value is equal to the second timing offset value is used to determine a size relation between the first count value and the second count value; a random access initiated by the first signal is unsuccessful.

In one embodiment, when the first timing offset value is equal to the second timing offset value, the second count value is equal to the first count value plus 1; and when the first timing offset value is not equal to the second timing offset value, the second count value is not greater than the first count value.

In one embodiment, a format adopted by the first signal is related to the first timing offset value, and a format adopted by the second signal is related to the second timing offset value; a format adopted by the first signal comprises at least one of a length of a sequence generating the first signal, a length of a cyclic prefix comprised in the first signal, or a blank length comprised in time-domain resources occupied by the first signal; a format adopted by the second signal comprises at least one of a length of a sequence generating the second signal, a length of a cyclic prefix comprised in the second signal, or a blank length comprised in time-domain resources occupied by the second signal.

In one embodiment, the second transceiver 1001 transmits first information; the first information is used to determine a first target power value and a first step-size; when the first count value is greater than 1, the first target power value, the first step-size and the first count value are used together to determine a transmit power value of the first signal; when the first count value is equal to 1, only the first target power value among the first target power value, the first step-size and the first count value is used to determine a transmit power value of the first signal.

In one embodiment, when the first timing offset value is equal to the second timing offset value, the first target power value, the first step-size and the second count value are used together to determine a transmit power value of the second signal.

In one embodiment, the second transceiver 1001 transmits second information; the second information is used to determine a second step-size; when the first timing offset value is not equal to the second timing offset value and the second count value is greater than 1, the first target power value, the second step-size and the second count value are used together to determine a transmit power value of the second signal; when the first timing offset value is not equal to the second timing offset value and the second count value is equal to 1, only the first target power value among the first target power value, the second step-size and the second count value is used to determine a transmit power value of the second signal.

In one embodiment, the second transceiver 1001 transmits a third signal; the third signal is used to determine the reference timing; a timing offset between a timing for transmitting the first signal and the reference timing is equal to the first timing offset value, and a timing offset between a timing for transmitting the second signal and the reference timing is equal to the second timing offset value.

In one embodiment, a capability of a transmitter of the first signal is used to determine the first timing offset value.

In one embodiment, the second transceiver 1001 transmits third information; when the first timing offset value is not equal to the second timing offset value, the second count value is equal to 1, and the third information is used to determine an upper limit of the first count value.

In one embodiment, the second transceiver 1001 transmits a fourth signal; the fourth signal is used to indicate that a transmitter of the first signal can determine the first timing offset value according to its own capability, or the fourth signal is used to indicate that a transmitter of the first signal can determine the second timing offset value according to its own capability.

In one embodiment, the second transceiver 1001 comprises at least first six of the antenna 420, the transmitter/receiver 418, the multi-antenna transmitting processor 471, the transmitting processor 416, the multi-antenna receiving processor 472, the receiving processor 470, and the controller/processor 475 in embodiment 4.

In one embodiment, the first receiver 1002 comprises at least the first four of the antenna 420, the receiver 418, the multi-antenna receiving processor 472, the receiving processor 470 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node and the second node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSUs and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, the first node comprising:
    a transceiver; and
    a processor, wherein the transceiver and the processor are configured to:
        estimate a first timing offset value comprising a first timing advance of an uplink transmission from the first node to a second node,
        determine, based on the first timing advance, a first timing for transmitting a first signal,
        initiating a random access by transmitting the first signal at the first timing, wherein a target counter is used for counting in the random access initiated by the first node, and wherein a count value of the target counter is a positive integer, and wherein a count value of the target counter when transmitting the first signal is a first count value, and wherein the random access initiated by the first signal is unsuccessful,
        estimate a second timing offset value comprising a second timing advance of the uplink transmission from the first node to the second node,
        determine, based on the second timing advance, a second timing for transmitting a second signal,
        initiating the random access by transmitting the second signal at the second timing, wherein the count value of the target counter when transmitting the second signal is a second count value,
        wherein a size relation between the first count value and the second count value is based on whether the first timing offset value is equal to the second timing offset.

2. The first node according to claim 1, wherein when the first timing offset value is equal to the second timing offset value, the second count value is equal to the first count value plus 1;
    and wherein when the first timing offset value is not equal to the second timing offset value, the second count value is not greater than the first count value.

3. The first node according to claim 1, wherein a format adopted by the first signal is related to the first timing offset value, and a format adopted by the second signal is related to the second timing offset value; and
    wherein the format adopted by the first signal comprises at least one of a length of a sequence generating the first signal, a length of a cyclic prefix comprised in the first signal, or a blank length comprised in time-domain resources occupied by the first signal; and
    wherein the format adopted by the second signal comprises at least one of a length of a sequence generating the second signal, a length of a cyclic prefix comprised in the second signal, or a blank length comprised in time-domain resources occupied by the second signal.

4. The first node according to claim 1, wherein the processor and the transceiver are further configured to:
    receive first information, and
    determine, based on the first information, a first target power value and a first step-size,
    wherein when the first count value is greater than 1, the first target power value, the first step-size and the first count value are used together to determine a transmit power value of the first signal, and
    wherein when the first count value is equal to 1, only the first target power value among the first target power value, the first step-size and the first count value is used to determine a transmit power value of the first signal.

5. The first node according to claim 4, wherein when the first timing offset value is equal to the second timing offset value, the first target power value, the first step-size and the second count value are used together to determine a transmit power value of the second signal.

6. The first node according to claim 4, wherein the processor and the transceiver are further configured to:
    receive second information, and
    determine a second step-size based on the second information,
    wherein when the first timing offset value is not equal to the second timing offset value and the second count value is greater than 1, the first target power value, the second step-size and the second count value are used together to determine a transmit power value of the second signal, and
    wherein when the first timing offset value is not equal to the second timing offset value and the second count value is equal to 1, only the first target power value among the first target power value, the second step-size and the second count value is used to determine a transmit power value of the second signal.

7. The first node according to claim 1, wherein the processor and the transceiver are further configured to:
    receive a third signal, and
    determine a reference timing based on the third signal,
    wherein a timing offset between the first timing and the reference timing is equal to the first timing offset value, and
    wherein the timing offset between the second timing and the reference timing is equal to the second timing offset value.

8. The first node according to claim 1, wherein a capability of the first node is used to determine the first timing offset value.

9. The first node according to claim 1, wherein the processor and the transceiver are further configured to:
    receive third information, and
    when the first timing offset value is not equal to the second timing offset value, the second count value is equal to 1, determine an upper limit of the first count value based on the third information.

10. The first node according to claim 1, wherein the first timing offset value is not equal to 0, and the first timing offset value is related to at least one of:
    a type of the second node,
    a height of the second node, or
    position information of the first node.

11. The first node according to claim 1, wherein the second timing offset value is not equal to 0, and the second timing offset value is related to at least one of:
    a type of the second node,
    a height of the second node, or
    position information of the first node.

12. The first node according to claim 1, wherein when the first timing offset value is not equal to the second timing offset value, the second count value is equal to 1, and wherein when the first timing offset value is equal to the second timing offset value, the first count value is equal M, and the second count value is equal to M+1, M being a positive integer.

13. The first node according to claim 1, wherein a format adopted by the first signal is a first format, the first format is a format in a first format set, the first format set comprises one or a plurality of formats, and the first node generates the first signal by adopting the first format in the first format set when transmitting the first signal with the first timing offset value, and
wherein a format adopted by the second signal is a second format, the second format is a format in a second format set, the second format set comprises one or a plurality of formats, and the first node generates the second signal by adopting the second format in the second format set when transmitting the second signal with the second timing offset value.

14. The first node according to claim 13, wherein the first format and the second format respectively correspond to different generation sequence lengths, or
wherein the first format and the second format respectively correspond to different cyclic prefix lengths, or
wherein the first format and the second format respectively occupy different blank lengths.

15. A second node for wireless communications, the second node comprising:
a transceiver; and
a processor, wherein the transceiver and the processor are configured to:
detect a first signal used to initiate a random access, wherein a target counter is used for counting in the random access initiated by a transmitter of the first signal, and wherein a count value of the target counter is a positive integer, and wherein a count value of the target counter when transmitting the first signal is a first count value, and wherein the random access initiated by the first signal is unsuccessful, and
detect a second signal used to initiate the random access, wherein the count value of the target counter when transmitting the second signal is a second count value, and
wherein a first timing offset value is used to determine a first timing for transmitting the first signal, and a second timing offset value is used to determine a second timing for transmitting the second signal, and
wherein whether the first timing offset value is equal to the second timing offset value is used to determine a size relation between the first count value and the second count value.

16. The second node according to claim 15, wherein when the first timing offset value is equal to the second timing offset value, the second count value is equal to the first count value plus 1, and
wherein when the first timing offset value is not equal to the second timing offset value, the second count value is not greater than the first count value, and
wherein the first timing offset value comprises a timing advance of an uplink transmission from a first node to the second node estimated by the first node, and
wherein the second timing offset value comprises a timing advance of an uplink transmission from the first node to the second node estimated by the first node.

17. The second node according to claim 15, wherein a format adopted by the first signal is related to the first timing offset value, and a format adopted by the second signal is related to the second timing offset value, and
wherein the format adopted by the first signal comprises at least one of a length of a sequence generating the first signal, a length of a cyclic prefix comprised in the first signal, or a blank length comprised in time-domain resources occupied by the first signal, and
wherein the format adopted by the second signal comprises at least one of a length of a sequence generating the second signal, a length of a cyclic prefix comprised in the second signal, or a blank length comprised in time-domain resources occupied by the second signal.

18. The second node according to claim 15, wherein the processor and the transceiver are further configured to:
transmit first information used to determine a first target power value and a first step-size,
wherein when the first count value is greater than 1, the first target power value, the first step-size and the first count value are used together to determine a transmit power value of the first signal, and
wherein when the first count value is equal to 1, only the first target power value among the first target power value, the first step-size and the first count value is used to determine a transmit power value of the first signal.

19. The second node according to claim 18, wherein when the first timing offset value is equal to the second timing offset value, the first target power value, the first step-size and the second count value are used together to determine a transmit power value of the second signal.

20. A method in a first node for wireless communications, comprising:
transmitting a first signal used to initiate a random access; and
transmitting a second signal used to initiate a the random access,
wherein a target counter is used for counting in the random access initiated by the first node, and a count value of the target counter is a positive integer, and
wherein a count value of the target counter when transmitting the first signal is a first count value, and the count value of the target counter when transmitting the second signal is a second count value, and
wherein a first timing offset value is used to determine a first timing for transmitting the first signal, and a second timing offset value is used to determine a second timing for transmitting the second signal, and
wherein whether the first timing offset value is equal to the second timing offset value is used to determine a size relation between the first count value and the second count value, and
wherein the random access initiated by the first signal is unsuccessful, and
wherein the first timing offset value comprises a timing advance of an uplink transmission from the first node to a second node estimated by the first node, and
wherein the second timing offset value comprises a timing advance of an uplink transmission from the first node to the second node estimated by the first node.

* * * * *